(12) United States Patent
Huntsman

(10) Patent No.: US 8,091,093 B2
(45) Date of Patent: Jan. 3, 2012

(54) SYSTEM AND METHOD FOR INFORMATION ASSURANCE BASED ON THERMAL ANALYSIS TECHNIQUES

(75) Inventor: Steve Huntsman, Alexandria, VA (US)

(73) Assignee: Equilibrium Networks, Incorporated, Alexandria, VA (US)

( * ) Notice: Subject to any disclaimer, the term of this patent is extended or adjusted under 35 U.S.C. 154(b) by 713 days.

(21) Appl. No.: 12/246,103

(22) Filed: Oct. 6, 2008

(65) Prior Publication Data
US 2009/0094618 A1 Apr. 9, 2009

Related U.S. Application Data

(60) Provisional application No. 60/977,898, filed on Oct. 5, 2007.

(51) Int. Cl.
*G06F 13/00* (2006.01)

(52) U.S. Cl. ......... 719/318; 709/223; 709/224; 715/736

(58) Field of Classification Search .................. 719/318; 709/223, 224; 715/736
See application file for complete search history.

(56) References Cited

U.S. PATENT DOCUMENTS 6,965,886 B2* 11/2005 Govrin et al. .................. 706/45
2004/0250261 A1* 12/2004 Huibregtse .................... 719/318

* cited by examiner

*Primary Examiner* — Andy Ho
(74) *Attorney, Agent, or Firm* — Rothwell Figg Ernst & Manbeck

(57) ABSTRACT

Systems and methods for network security are disclosed. Embodiments of the present invention include a scalable, real-time solution to complement existing security systems and detect unusual activity. Embodiments of the present invention leverage the scale and complexity of networks and use the principles of statistical physics and thermodynamics to define thermal properties like entropy, temperature and energy for network states and changes in the properties as packets move through the network.

18 Claims, 8 Drawing Sheets

SYSTEM AND METHOD FOR INFORMATION ASSURANCE BASED ON THERMAL ANALYSIS TECHNIQUES

BACKGROUND OF THE INVENTION

1. Field of the Invention

This invention relates generally to techniques for analyzing symbolic time series. More particularly, the invention relates to methods for characterization and identifying dynamical features of time series data that is either initially given as or transformed into a sequence of ordered symbolic pairs, such as communications traffic, financial transactions, logistical, genetic, or time series data.

2. Description of the Related Art

Proliferating analytic approaches suffer collectively from various problems such as overspecialization, scalability, and opacity of the methods used. Detection operating characteristics often leave considerable room for improvement and the architectures required for these approaches often do not readily admit effective post-analysis techniques. The detection operating characteristic shortcomings are typically addressed by narrowing the analytic scope of a system into one of two basic frameworks. Generic analytical techniques such as neural networks or hidden Markov models tend to be more mathematical in nature and often suffer from under-fitting and inadequate characterization of inputs but benefit from comparative rigor and versatility, whereas specialized techniques tailored to a particular problem domain tend to be more heuristic and often suffer from over-fitting and over-reliance on, or uncertainty about, the details of inputs. A general technique combining rigor and flexibility in a high-performance analytic framework is therefore desirable. Additional desiderata of such a technique include the ability to address static or dynamical data scalably and efficiently, as well as to enable post-processing and data interactivity. For the sake of concreteness, a particular application of the present invention to monitoring computer network traffic is detailed.

While worldwide spending on network security is estimated to be over $30 billion per year and growing, the information infrastructure is increasingly less secure. Security incidents reported to the CERT Coordination Center (CERT/CC)—the first computer emergency readiness team—rose 2,099 percent from 1998 through 2002—an average annual compounded rate of 116%. As evidenced by increasing cyber crime, existing security systems, most of which use signature- and heuristic-based analysis for detection, are ineffective against new attacks, variations of known attacks or attacks masked as normal network behavior.

Embodiments of the present invention include a scalable, real-time solution to complement existing security systems and detect unusual activity. Embodiments of the present invention may exploit the complex nature of the information infrastructure where millions of packets are exchanged between thousands of component parts. The nonlinear dynamics of the system exhibit complex global behavior and time evolution, leading to tipping point phenomena, where anomalous or malicious behaviors are hardly noticeable and suddenly the system transitions from operational to non-operational. Embodiments of the present invention leverage the scale and complexity of networks and use the principles of statistical physics and thermodynamics to define thermal properties like entropy, temperature and energy for network states and changes in the properties as packets move through the network. Fluctuations in state properties reveal unusual network activity that is not detectable by signature- and heuristic-based systems and leads to detection of anomalous or malicious behaviors before reaching a tipping point. The key to realizing the overall vision is the real-time network sensing, packet processing, and interface to intuitively display alerts that highlight changes in network behavior as well as providing an autonomous operational capability.

The methods of information theory play a unique role in this context, in that they are rigorous and generic but often find considerable success even in narrow problem domains. By the same token, the increasing application of the methods of stochastic processes and statistical physics to nontraditional areas and the many connections between these fields augur the need for, and the importance of, a unifying analytic architecture leveraging their techniques. Background references include: U.S. Pat. No. 6,470,297, which describes a system known as Therminator; J. C. McEachen et al., "*Real-time representation of network traffic behavior for enhanced security*," 2005, Proc. 3rd Int. Conf. on Info. Tech. and Appl.; and J. C. McEachen et al., "*An analysis of distributed sensor data aggregation for network intrusion detection*," 2007, Microprocessors and Microsystems vol. 31, pp. 263-272. These background references were developed by the U.S. Department of Defense and used the spirit of information theory and statistical physics in an early step towards this end. Therminator maps network traffic onto a sequence of ordered symbolic pairs and subsequently onto a sample trajectory of a multi-urn Ehrenfest model. The average state and the distribution of states in this model are supplied for visualization along with thermodynamical quantities including an effective temperature that mimics some coarse features of the essentially unique temperature function consistent with equilibrium statistical physics. Independent academic work highlighting the essential tractability of computer network traffic using the idiom of thermal field theory (M. Burgess, "Thermal, nonequilibrium phase space for networked computers," 2000, Phys. Rev. E, vol. 62, pp. 1738-1742) also contributed in this direction. This approach used the fact that resealing a fluctuating time series in units of its standard deviation is a conformal transformation. By applying such a transformation to pseudo-periodic time series, the methods of thermal field theory can be used to describe the underlying data. In this work it is noted that computer network traffic is pseudo-periodic due to diurnal, weekly, monthly, and yearly patterns, and this fact is used in order to describe information transactions along the lines above.

However, both these methods face several problems, such as a dependence on initial and boundary conditions in their internal data representation or the underlying data itself; a lack of any mathematically rigorous method for automatically identifying dynamical features in data; and an insufficiently realized capability for post-processing or interactivity.

Thus, there is a need for new and improved systems and methods for information assurance. Such systems and methods should receive an anomalous event parameter; receive a plurality of network events from a network; associate each of the network events with a timestamp; classify each of the network events into at least one of a plurality of cycles, based, at least in part, on the timestamp; form a dynamical state probability distribution corresponding to the plurality of network events; compute a discrete martingale for the plurality of network events; computationally determine whether or not a network event of the plurality is anomalous, based, at least in part, on the anomalous event parameter; and store the determination to a computer readable medium or display the determination.

SUMMARY OF THE INVENTION

Various aspects of the present invention provide systems and methods for characterization of and dynamical feature detection in sequences of ordered symbolic pairs. One aspect provides a pre-processing method for producing such sequences. Another aspect of the invention is directed to a method for characterizing such sequences directly in terms of the pair statistics. Another aspect of the present invention is to provide a method for thermodynamically characterizing such sequences. Another aspect of the present invention is to provide a method for producing and analyzing martingales from such sequences. Additional aspects of the invention will become clear in light of the following description.

Aspects of the invention in the context of information assurance (and more generally where appropriate) include: (1) the approach is intrinsically scalable; (2) it is applicable to zero day attacks, encrypted or obfuscated traffic, covert channels, etc; (3) it offers improved performance over existing network behavior analysis (NBA) methods; (4) it handles multi-gigabit links with commodity hardware; (5) it operates in real time; (6) it features a modular design to increase security, accommodate innovations, and enhance performance; and (7) the methodology and implementation appear to have useful applications to social, transportation and logistical networks, financial markets, etc.

One aspect of the present invention is directed to taking advantage of the methods of thermal physics and martingale theory to enable characterization and dynamical feature detection of sequences of ordered symbolic pairs. Rather than relying on visualization or ad hoc analysis of the results of processing such sequences, a method consistent with the invention determines the likelihood of features from the intrinsic structure of the underlying data. Intuitively, a dynamical feature occurs in a sequence of ordered symbolic pairs if there is an unusual local variation in the pair statistics. Not all features are of equal significance, however. The sudden appearance of a few rare pairs or a dramatic change in the local statistics of pairs from one subsequence to another will generally be of more import than slight but detectable variations in the pair statistics. Thus, the likelihood that a detected putative feature corresponds to a real feature should be determined and a simple description of the dynamics should be made available for post-processing. The use of martingale-based techniques coupled with the data-reduction methods of information theory and thermal physics provide such a capability.

One aspect of the invention is a method for information assurance, comprising retrieving network activity consisting of a plurality of network events, classifying a network event into at least one of a plurality of cycles, applying tree logic to a network event to place the network event into a node database, forming a dynamical set of routing data and attendant state probability distribution corresponding to the network events and computing a discrete martingale reflecting characteristics of the underlying sequence of network events.

Another aspect of the invention provides a server configured to provide information assurance. The server contains a sensing module coupled to a network and configured to sense network activity and configured to pre-process packets according to decision tree logic using either static decision nodes or dynamical nodes involving node databases, and a core module coupled to the sensing module. The core module also constructs a martingale and inspects for anomalous events.

A further aspect of the invention provides a computer readable medium encoded with instructions configured, when executed, to retrieve network activity consisting of a plurality of network events, produce a timestamp corresponding to an internal or external sense of time, classify a network event into at least one of a plurality of cycles, apply tree logic to produce a pair of leaf nodes corresponding to origin and destination (or initial and successive) data of the network event, form a dynamical state probability distribution corresponding to the network events and compute a discrete martingale.

A still further aspect of the invention provides a system for information assurance consisting of a network, multiple sensor modules, an aggregator module and a core module. The sensor module is coupled to the network and configured to sense network activity. The sensor module collects time and address information for a network packet and produces a pair of leaf nodes according to the particular configuration of the sensor. The aggregator module is coupled to the sensor modules and accesses the time and address information. The aggregator module uses the leaf node pair information to produce a new leaf node pair that shares common features with pairs produced from data from other sensors. The core module runs at least two thermal algorithms to characterize the current state of network traffic.

Because any time series containing dynamical features cannot be stationary, the simple methods of information theory are insufficient for analytic purposes. At the same time, purely statistical or probabilistic techniques encounter problems with rigor and interpretation. However, suitable local versions of entropy and other thermal data combined with a rigorous martingale-based analysis of fluctuating quantities enable the detection, post-processing for, and intuitive interpretation of dynamical features.

In one aspect of the invention, a method implemented with multiple computer processor cores is provided for the characterization of and dynamical feature detection in sequences of ordered symbolic pairs.

Additional aspects, applications, and benefits of the present invention will become clear in light of the following descriptions with reference to the drawing figures.

DETAILED DESCRIPTION OF THE INVENTION

Figure 1:
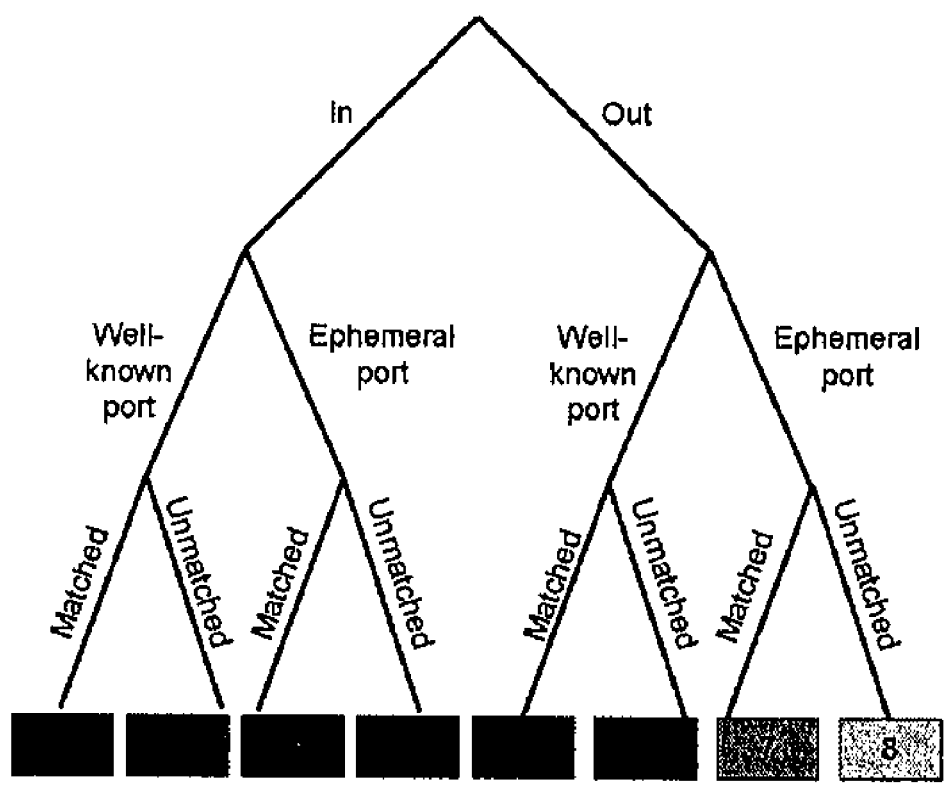
FIG. 1 illustrates exemplary TCP/UDP tree logic to effect state transitions.

Although the following detailed description provides specifics for the sake of illustration, any person of ordinary skill in the art will recognize that many variations and modifications to the following details are within the scope of the invention. Accordingly, the following embodiments of the invention are set forth without limiting the scope of, and without any loss of generality to, the claimed invention.

Embodiments of the present invention may consist of three modules: a sensing module that pre-processes incoming data;

a core module that runs the key thermal algorithms on the pre-processed data; and an interface module featuring autonomous or graphical user interfaces that respectively act upon or present the resulting data. Hardware components serve to offload processing, allowing the use of commodity PCs and the production of elegant, flexible code.

Advantages of Selected Embodiments

Intrinsically scalable—offers high performance and a natural capability for integration and fusion. The processing power required scales linearly with the number of packets.

Does not rely on knowledge of packet payloads—applicable to zero day attacks, encrypted or obfuscated traffic, covert channels, etc., yet the system can be extended to incorporate payload information in a straightforward way, enabling (e.g.) analysis of the upper layers in the protocol stack.

Improved performance—the number of false alarms is essentially independent of the monitored link size; moreover, our techniques include a quantitative basis for alert generation/misuse detection, providing the capability to set parameters for automated alarms on a rigorous mathematical footing.

Runs on commodity hardware—DAG and graphics processing units (GPUs) allow the use of commodity PCs/workstations even at 10 Gbps; only the implementation of node databases (which is a highly desirable feature rather than a basic element) appears to raise the possible but unlikely need for extra hardware (Cheap, off the shelf, FPGA cards). Much of the software may be parallelizable.

Operates in real time—integrated visualization and drill-down at an operational cost that is an order of magnitude lower than present competitors.

Incorporates a modular design—to increase security, accommodate innovations, and enhance performance.

Flexible—naturally incorporates local behavior into the configuration. Dynamical node databases quickly adapt to changes in network traffic over time.

General application—much of the THETA methodology and even its implementation has useful applications to social, transportation and logistical networks, as well as financial markets, etc.

It is an object of this invention to devise a system and method for the analysis of sequences of ordered symbolic pairs. The method should be capable of autonomous operation effectively in real-time. Further, the method should avoid dependency on user interaction to identify dynamical features of the analyzed data, while enabling user interaction as desired to augment the autonomous capabilities.

It is yet another object that the method is both computationally efficient and scalable to enable analysis at progressively higher data rates.

It is still yet another object that the method be applicable to both generic symbolic time series and to time series of symbolic pairs.

According to one embodiment of the present method, a symbolic sequence or time series is first transformed into a corresponding sequence of symbolic pairs by considering a subsequence of symbols and a succeeding (possibly overlapping) subsequence as the effective symbols.

Sequences of ordered symbolic pairs admitting fruitful analysis can be obtained by (perhaps trivially) parsing virtually any data source. For example, the iSAX (J. Shieh et al., "iSAX: Indexing and Mining Terabyte Sized Time Series," 2008, Proc. 14$^{th}$ ACM Conf. on Knowledge Discovery and Data Mining, the entire contents of which are incorporated herein by reference) and related symbolization protocols (F. Mörchen et al., "Optimizing Time Series Discretization for Knowledge Discovery," 2005, Proc. 11$^{th}$ ACM Conf. on Knowledge Discovery and Data Mining, the entire contents of which are incorporated herein by reference; a review of symbolization protocols is given in C. S. Daw et al., "A review of symbolic analysis of experimental data," 2003, Rev. of Scientific Instruments, vol. 74, pp. 916-930, the entire contents of which are incorporated herein by reference) can transform a real-valued time series in continuous time into a discrete sequence of symbols.

In another embodiment, sequences of ordered symbolic pairs are made available for analysis due to the nature of the underlying processes generating the data, for example by mapping both origin and destination attributes (e.g., spatial or logical location or affiliation identifiers, functional identifiers, historical identifiers, etc.) of communications, financial, metabolic, or other data onto a common symbol alphabet, whether in a data-reduced way or in full generality. In another embodiment, each symbol pair is considered as a symbol over a larger alphabet and doublets of symbol pairs are analyzed. In another embodiment, multiple sequences of symbol pairs over different alphabets are combined into a single sequence by mapping every possible pair to a pre-defined pair over a new alphabet and interleaving the resulting sequences.

Although elements of the method of the present invention bear a superficial resemblance to Therminator and existing martingale detection methods (S.-S. Ho et al., "Detecting Change-Points in Unlabeled Data Streams using Martingale," 2007, Proc. 20$^{th}$ Int. Joint Conf. Artificial Intelligence; V. Vovk et al., "Testing exchangeability on-line," 2003, Proc. 20$^{th}$ Int. Conf. on Machine Learning, the entire contents of which are incorporated herein by reference), the present method is more sophisticated, complex, and general than either when applied in the present context, and the present method gives superior results.

The THETA Modular Architecture

One or more embodiments of the present invention relate to what is known as ASIA THETA, for Advanced Scalable Information Assurance via Thermal Traffic Analysis. The ASIA THETA modular architecture provides significant advantages over alternative approaches and other implementations of the underlying principles. By separating the generation of packet metadata, the core processing, and interfaces, the architecture may be more readily adaptable, while also making balanced use of the resources of commodity PCs and workstations.

In the sensing module, a DAG may be used to enable time stamping of sufficient quality for the core algorithms to work properly at 10+ Gbps traffic rates, while simultaneously offloading filtering and packet capture from CPUs. Processing power is thereby freed for the necessary tree logic, database operations, parsing, queuing, and I/O operations. Most of the hard disk can be used for packet headers and periodic node database writes.

Meanwhile, the processing module makes fairly efficient use of the main elements of a commodity PC or workstation: volatile memory is used in the course of processing as well as for I/O. The hard disk sees only slight use, but the CPUs may be used to the utmost for I/O and the core thermal processing. The display module makes similar use of resources, while also leveraging a GPU.

The overall THETA system therefore provides a flexible, low-cost, high-performance solution for network behavior analysis, traffic visualization, and forensics.

A software-based THETA system running on commodity hardware may be used on a 100+ Mbps link.

Such a software-based system is an extremely powerful and cost-effective solution, but it may not be ideal on gigabit-class links. In principle the THETA system can be implemented at arbitrary speeds (for instance by placing it directly on a router) but practical issues quickly come to the fore. An accelerated THETA system is under development for 10+ Gbps links and future systems may be built on 100 Gbps or terabit links.

Overview of the Problem

Threats to network defenses are increasing in scale and scope

Our ability to defend networks may be decreasing due to the advancing sophistication of enemies (evolving from recreational hackers to organized crime to terrorists and nation states), the increased availability of advanced technologies (e.g., encryption and poly/metamorphism), and the pervasiveness of the threat (advancing from boot sector viruses to flash worms to botnets). As the volume of traffic on the GIG grows through the transition to IPv6, increased integration onto the network, and encrypted core traffic, threat signatures will fade and the ability to provide defense-in-depth with traditional methods will be diminished.

Scaling of Networks Will Lead to Defensive Exposure

One particularly pressing aspect of the growing Global Information Grid (GIG) is the exponential increase in scales of the network. First, the number of hosts is increasing at an exponential rate: IPv6 increases the address space by 27 orders of magnitude and the number of hosts connected to the network has a growth factor per decade (GFPD) of $10^{2.4}$ over the last 25 years. Second, the availability of bandwidth and network traffic levels have also increased exponentially, with a $10^{3.3}$ GFPD over the last 25 years as well. Finally, the processing power of computers has also grown exponentially: in addition to clock speed, the number of instructions per second has grown with a $10^{1.8}$ GFPD over the last 35 years. Because traffic volume is increasing at a faster rate that the number of hosts on the network, the computing power required to provide gateway monitoring of autonomous systems will continually grow as a fraction of the power of the monitored network. These factors combine to increase the magnitude of the challenge facing the defense of computer networks, beyond which most traditional defense approaches will not work.

Signature-based scanning will not be a viable primary approach to monitoring traffic at future computer network scales. First-generation scanning, including brute force and backward string matching approaches, scale linearly with the number of signatures in the threat database: the computational complexity is O(nk), where n is the data rate and k is the number of signatures. Because signature databases have been growing exponentially with $\sim 10^{4.5}$ GFPD, current first-generation string-based scanners will not be able to keep up with the pace of malware development. Combining the scaling data for bandwidth growth and signature database growth, divided by the advancement in CPU power O(c), yields $$O(nk)/O(c) = 10^{3.3} \cdot 10^{4.5}/10^{1.8} = 10^{6.0} \text{ GFPD}$$

indicating that the requirements of gateway scanning devices will grow by a factor of almost one million every decade, outpacing the growth in number of hosts h by several orders of magnitude. So the fraction of computing power required for gateway signature-based scanning will grow by $$(O(nk)/O(c))/O(h) = 10^{6.0}/10^{2.4} = 10^{3.6} \sim 4000 \text{ GPFD}$$

and quickly consume the majority of the processing power of the network.

Conventional heuristic anomaly detection will also not be a viable primary approach at future computer network scales. Because traffic characteristics such as volume, origin/destination pairs, and protocols will increase, unusual behavior used to detect anomalies through simple rule-based heuristics will become less pronounced; this decrease in equivalent "signal-to-noise" ratio will increase already unacceptably high false alarm rates. Rule-based monitoring will suffer the same fate as signature-based scanners above; packet classification algorithms have advanced to O(n+k) where n is the bandwidth and k is the rule set, leading to $$O(n+k)/O(c) \sim 10^{4.5}/10^{1.8} = 10^{2.7} \text{ GFPD},$$

which will also surpass the growth in number of hosts on the network, and more critically, lead to an unmanageable increase in the fraction of work required for gateway-level monitoring.

Behavior-blocking approaches suffer a fate similar to signature-based approaches, because malicious behaviors are so diverse—and sometimes subtle—that identifying them all is impossible. In the end, behavior-blocking databases will grow exponentially and become too large for effective gateway monitoring. Newer, processor-intensive approaches such as neural network-based anomaly detection will fall victim to the lag of processor power ($10^{1.8}$ GFPD; Moore, 2003, the entire contents of which are incorporated herein by reference) relative to host ($10^{2.4}$ GFPD; Internet Software Consortium, 2007, the entire contents of which are incorporated herein by reference) and traffic ($10^{3.3}$ GFPD; Odlyzko, 2003, the entire contents of which are incorporated herein by reference) growth, as well as increased demands on providing training data for larger and more diverse networks. Similarly, emulation-based approaches will be untenable as the number of hosts in the defended autonomous system grows faster than processor power required to emulate traffic. These scaling implications, as well as additional problems introduced by increased traffic diversity, indicate that heuristic anomaly detection will also not be suitable for primary GIG-scale defense. As a result, new computer network defense models are needed that can scale with the anticipated size of the future GIG.

To sum up, conventional network defense tools will not be able to keep pace with network scaling, and their implementations, insofar as they are used at all, will necessarily be placed deeper within autonomous systems and away from gateways, which will be left exposed.

The Need for Speed, Performance, and Scalability

Given the preceding, it is clearly necessary to find a way to offset the inevitable deficiencies in speed, performance, and scalability of conventional network defense methods.

Theoretical Background: Thermal Traffic Analysis (THETA) as a Solution.

A new approach to computer network defense (CND) is disclosed that is based on rigorous science instead of ad hoc or heuristic methods. Historically, the need for reduction of information in complex, large-scale systems resulted in the development of theoretical thermodynamics. Computer and communication systems also behave in ways best described through thermodynamics and statistical physics. Below is how the application of the principles of thermodynamics to large-scale computer networks informs high-speed, high-performance, and scalable network defense platforms.

The THETA approach, one embodiment of the invention, is inherently scalable. Because the system does not search for strings, there are no signature database scalability concerns. Similarly, there are no emulation hardware requirements, etc. In fact, the simple substrate underlying the THETA system that extracts and reformats the salient metadata from packets by invoking a decision tree structure suggests a natural parallelization strategy.

Furthermore, once the relevant physical and mathematical quantities are calculated, they can be further aggregated to data from other networks to monitor larger networks or, collectively, sub-networks. This fusion strategy scales linearly with the number of hosts monitored. As a result of the linear scaling, this approach is superior to other approaches, and is the only approach known that is applicable to networks at the scale and with the traffic diversity of the future GIG.

Finally, as the network and number of hosts becomes larger and larger, the behavior of interactions in the network will more closely resemble that of a classical rather than a "small" thermodynamical system and a careful implementation may become even more applicable and provide even better detection and false alarm performance in absolute terms.

Brief Theoretical Outline

In order to analyze dynamical features of sequences of ordered symbolic pairs, the present method considers subsequences of such pairs (and their associated discrete or continuous time intervals) called cycles and defined in terms of stopping times (e.g., the millionth pair or the first pair observed after a given external time), with the understanding that for this purpose the sequence is treated as a stochastic process. The use of stopping times legitimizes the subsequent use of sampling theorems to facilitate further data reduction. In order to admit the broadest relevant sorts of stopping times, the present method requires an adequate timestamping mechanism. In one embodiment, a dedicated processor core is devoted to this purpose. In another embodiment, a dedicated hardware clock or computer card capable of high-precision timestamping is used.

In one embodiment of the present invention, cycles are disjointed and exhaustive, i.e., every pair and its corresponding time are associated to one and only one cycle. In another embodiment, cycles are partially overlapping, and a sliding window that also relies on stopping times is used to determine the cycles.

Without loss of generality, suppose the symbols in the pairs belong to a common alphabet with n symbols. If in a given cycle, j and k are symbols from this common alphabet, then $N_{jk}$ denotes the number of pairs (j, k) in the cycle. After conditioning the resulting matrix N (for example by adding 1 to every entry), an ergodic stochastic routing matrix R and rate tuple q are computed via the equations $$R_{jk} = N_{jk}/\Sigma_k N_{jk}$$

and $$q_j = \Sigma_k N_{jk}/t_{cyc}.$$

Because R is ergodic, it possesses a well-defined invariant distribution $\pi$ satisfying $$\pi R = \pi$$

and $$\pi_j + \ldots + \pi_n = 1.$$

The routing matrix and rate tuple are used to construct one or more sets or tuples of characteristic times corresponding to symbols or symbol pairs. In general, $t_\infty$ denotes the characteristic recurrence time given as the sum of the characteristic times in such a tuple. In one embodiment, a n-tuple of characteristic times is produced by setting $$\eta_j = \pi_j/q_j$$

In an alternate embodiment, a family of n n-tuples of characteristic times is produced by setting $$t_{(j),k} = R_{jk}/q_j.$$

In still another alternate embodiment, a tuple of characteristic times is produced that corresponds to a classical Bose gas of N particles, each with n internal states, viz.

$$t_\alpha = t_\infty \eta^\alpha/z(\eta; n, N)$$

where standard multi-index notation is employed, $\alpha$ is a state of the Bose gas (i.e., $\alpha_1 + \ldots + \alpha_n = N$), $z = \Sigma_\alpha \eta^\alpha$, and the characteristic recurrence time $t_\infty$ is defined as the average inverse net service rate, viz.

$$t_\infty = z^{-1} \cdot \Sigma_\alpha \eta^\alpha/\lambda(q, \alpha)$$

where $\lambda(q, \alpha) = \Sigma q_j$ with the sum extending over all j such that $\alpha_j \neq 0$. (For relatively small values of n and N, $t_\infty$ can be evaluated directly, and it can be shown that efficient evaluation schemes exist for larger values.)

Given a tuple t of characteristic times, and corresponding tuple p of probabilities given by $p = t/t_\infty$ not only the corresponding Shannon entropy $$S(t) = -\Sigma_j p_j \log p_j$$

but also the essentially unique effective temperature consistent with the Gibbs relation $p_j = Z^{-1} \cdot \exp(-E_j/\Theta)$ in equilibrium statistical physics and dimensional scaling is computed, i.e.

$$\Theta(t) = \|t\|^{-1} \cdot \{\Sigma_k (n^{-1} \Sigma_j \log [t_j/t_k])^2 + 1\}^{-1/2}$$

and the various corresponding energies $E_j$ obtained by closing the Gibbs relation, as well as derived thermodynamical quantities such as work and heat (the time derivatives or the work and heat are computed by taking the corresponding contributions to the time derivative of the internal energy using the product rule). These and related quantities provide a useful characterization of the sequence of ordered symbolic pairs that is amenable to automated detection of dynamical features in the underlying data, e.g., by analysis using principal components or a machine learning technique.

Given a sequence of ordered symbolic pairs, the present method also constructs a corresponding sequence of indices representing an abstract induced state trajectory. This is necessary in order to use martingale techniques: both a generator consistent with the trajectory and the trajectory itself are necessary ingredients in the application of the Dynkin formula detailed below. In one embodiment, based on the essentially unique construction of a class of minimal periodic colorings of the root lattice $A_{n-1}$ and using the definition $\rho_n(m) = (m-1) \mod n+1$, the iterative assignment $$\kappa_{l+1} = \rho_n(\kappa_l - j_l + k_l)$$

is used to produce a well-defined state $\kappa_l$ for the lth pair. Non-minimal colorings admitting similar iterative assignments also exist and in another embodiment these are used: for example, with n=4 there is at least one periodic coloring with eight colors that combines the assignment above (which corresponds to the cyclic group with four elements in an essentially unique way) with a coloring induced by a local action of the Klein four-group. In another embodiment, the pairs themselves are taken considered to be effective states.

The formation of such a trajectory enables the construction and subsequent analysis of putative martingales related to the underlying data. Martingale theory provides powerful quantitative tools that establish good estimates of the probability of fluctuations. For example, if M is a discrete martingale such that $|M_l-M_{l-1}| \leq c_l$ almost surely, then a corollary of the Azuma-Hoeffding inequality is the parametric inequality $$P((M_l-M_0)^2 \geq 2\|c_{[l]}\|^2 \log(2/p)) \geq p.$$

where P denotes any probability measure with respect to which M is a martingale, $c_{[l]}=(c_1, \ldots, c_j)$, and the $l_2$ norm is indicated. In one embodiment of the present invention, a value of p is chosen so as to produce a certain expected range of violations of the above inequality for sample data without dynamical features, so that violations of this inequality then serve as an indicator of correspondingly unlikely fluctuations of M and, in turn, dynamical features of the underlying data.

In practice at least one continuous-time martingale M is constructed on a per-cycle basis, then sampled at stopping times to reduce the amount of data involved in analysis. Generally several such martingales are constructed, corresponding to different timescales. The sampling procedure, along with the essential independence of the parametric inequality with respect to the probability measure P, allows the derivation of the tightest possible bounds for M in terms of its actual evolution and the subsequent application of the parametric inequality to establish the degree of (un)likelihood of fluctuations.

In one embodiment of the present invention, the construction of martingales is performed using the fact that for a time-inhomogenous Markov generator Q the expression $$N_{jk}(t) - \int 1_j(X_s) \cdot Q_{jk}(s) ds$$

is a martingale, where $N_{jk}(t)$ indicates the number of transitions from j to k in the time interval from 0 to t, the integral is taken over the same interval, and $1_j$ is the indicator function of the jth state. In another embodiment, the construction of martingales is performed using Dynkin's formula, of which a reasonably general form is the assertion that $$f_t(X_t) - f_0(X_0) - \int (\partial_s + Q(s)) f_s \circ X_s ds$$

(where the integral is taken from 0 to t) is a martingale whenever the function f and the Markov generator Q of the trajectory X are sufficiently well-behaved. In order to produce such a martingale, it is still necessary to produce the generator and to compute the time derivative of the function f. In the preferred embodiment, the diagonal elements of a generator are taken to be such that the rows of the generator sum to zero. In one embodiment of the present invention, maximum-likelihood estimation of a constant Markov generator is performed on a per-cycle basis and amounts to setting $$Q_{ab} = N_{ab}/T_a$$

for $a \neq b$, $T_a$ is the time spent in the ath state over the cycle and $N_{ab}$ is given over the same cycle. In another embodiment, the time-inhomogeneous estimate $$Q_{ab} = EDN_{jk}/EDT_a$$

is used, where E indicates expectation and D indicates a time derivative. In another embodiment, a sliding window or other time averaging procedure is also used. Note that maximum-likelihood estimation of the Markov generator requires a timekeeping mechanism or surrogate thereof that provides an actual time, a counter, or a combination thereof along the lines discussed previously regarding stopping times. In another embodiment, estimation of varying generators is performed by filtering or another prediction scheme. In one embodiment where states are produced via the minimal coloring, the corresponding off-diagonal generator elements are derived from the routing matrix and rate tuple via the formula $$Q_{ab} = \Sigma q_j R_{jk}$$

where the sum is taken over all j and k such that a−b−j+k is congruent to zero modulo n.

In one embodiment of the present invention, the time derivative of the function or functions f is computed by a differencing scheme. In one embodiment of the present invention, multiple functions f are employed separately, one indicator function for each state (each such function is taken to be unity on its corresponding state and zero elsewhere). By linearity, this amounts to the general case in which f is constant as a function of time. In another embodiment, the function or functions f depend on some previous portion of the underlying data being analyzed. For instance, where pairs correspond to states, the function f may be taken to be the associated rate tuple.

In one particular embodiment, the Girsanov theorem is employed to compute likelihood-ratio processes (which are themselves martingales amenable to further analysis) for comparing the dynamics under the present generator with past or time-reversed generators and thereby identifying the existence of dynamical features corresponding to likelihood ratios sufficiently different from unity; and applying the transient fluctuation theorem and large-deviation inequalities to the sample mean entropy production rate $$W = t^{-1} \log(\rho_t \cdot P(X_0)/P(X_t))$$

where $\rho_t$ denotes the likelihood ratio under the maximum-likelihood generator and the generator of the time-reversed process.

An adaptation of statistical physics to computer network traffic analysis vastly reduces the complexity of traffic to a manageable level. Thermodynamics is a data reduction scheme based on partitioning a total system into a subsystem and an environmental bath that weakly interact with each other. The present invention hews to this principle, while decoupling the selection of observables/macrovariables based on such partitions from the calculation of mesoscopic averages. The proposed "metaformat" envisions a fixed number of leaf nodes, representing source and destination (or similarly directed) characteristics of the network traffic. As packets are exchanged between hosts on the network, in one embodiment a trajectory on (a quotient space of) the root lattice $A_{n-1}$ is produced in which each step corresponds to a leaf node pair and in turn the packet that produced this pair. In this embodiment The (meso)state of the network at any given time is defined by the element of the quotient space. In an alternate embodiment, the trajectory of (meso)states is defined by the leaf node pairs themselves.

When applied to computer networks, hosts are classified into groups depending on qualities such as relationship to the network being defended (inside or out), type of service being monitored (Domain Name Server (DNS) vs. Simple Network Management Protocol (SNMP) vs. Internet Control Message Protocol (ICMP)), more dynamical characteristics, etc. Thus the state of the network based on exchanges between hosts is defined independently of the number of hosts or traffic rate. This approach effectively scales with O(ns) where n is the bandwidth and s is the size of the leaf node space; however, the leaf node space essentially scales as O(1) and one has the growth factor $$O(ns)/O(c) = O(n)/O(c) = 10^{3.3}/10^{1.8} = 10^{1.5} \text{ GFPD},$$

indicating that the work required to provide gateway-level monitoring through thermodynamically-based approaches will grow at a slower rate than both the number of hosts in the network and processing power. This will translate into increasingly more affordable devices that leverage the fact that the leaf node space changes principally in response to changes in network functionality, instead of in response to changes on the attacker's part. This is illustrated, in part, in FIG. 1.

The second step in the application of thermodynamics to computer network defense characterizes the behavior of the network through time. As in classical thermodynamics, this behavior is characterized by variables such as entropy, temperature, etc. From these variables the behavior of the entire network is quantitatively—and, by using familiar physical concepts, qualitatively—characterized independently of the number of hosts or bandwidth.

As a coarse guide, and omitting the mathematical details given above, one measures both the net and characteristic durations of time corresponding to a set of states. In one embodiment, the states are given by elements of a quotient space of the root lattice $A_{n-1}$. In an alternate embodiment, the states are given by leaf node pairs. In still another embodiment, the states are those of a model classical Bose gas. One may then form not only a dynamical state probability distribution $P(\alpha)$ and its corresponding entropy, but also a dynamical empirical temperature. The state energies are easily obtained from the well-known Boltzmann-Gibbs probability distribution from statistical physics, viz.

$$P(\alpha) = \exp(-\beta E_\alpha)/Z,$$

where $\beta$ denotes inverse temperature (in Boltzmann units), $E_\alpha$ the energy of the state $\alpha$, and $Z$ is the so-called partition function, viz. $Z = \Sigma_\alpha \exp(-\beta E_\alpha)$.

With this in hand, it is a straightforward exercise to compute essentially any other physical quantity of interest. For instance, the (Shannon) entropy, internal energy and free energy are given respectively by $S = -\Sigma_\alpha P(\alpha) \log P(\alpha)$, $U = \Sigma_\alpha P(\alpha) E_\alpha$, and $F = -(\log Z)/\beta$. The application and execution of the thermodynamical methods are detailed elsewhere. Using the resulting exact correspondence between the network behavior and physics, quantitative discriminants of anomalous behavior are then derived. It is possible to obtain, e.g., entropy or energy fluctuations and determine whether or not the network is in a state of (near-) equilibrium. The established methods of physics will be leveraged to get a clear picture of network behavior that uses the intuitive language of temperature, work, heat, etc.

Put another way, abstract dynamical system with n states, state distributions—and system timescales themselves—evolve. Energy fluctuations in canonically distributed systems are small compared to the bath energy. This is not a restriction—it is a guide.

The structure of statistical physics allows for arbitrary numerical evolution of state energies . . . but also allows us to interpret the underlying dynamics physically as simultaneous changes to the system Hamiltonian and to the bath temperature.

Temperature Parametrizes Microcanonical Ensembles

Preferably, one may stipulate that state energies (although individually unknown a priori) satisfy $$E_1 + \ldots + E_n = 0 (E0).$$

Define two coordinate systems $t := (t_1, \ldots, t_n)$ t-space: "experimentalist's coordinates", and $H := (E_1, \ldots, E_n, \Theta)$ H-space: "theorist's coordinates".

Without a constraint, a Boltzmann-Gibbs (BG) Ansatz (for example) is underdetermined . . . henceforth stipulate BG and E0.

"Sphere Lemma"

t a H bijective implies probabilities are constant on rays in both spaces. This implies that $dt = dPtP \Leftrightarrow dH = dPHP$. This corresponds to constant probabilities. In turn, this and smoothness (mixed partials) imply that the map t a H sends sphere orthants to hemispheres.

$$\frac{t_k}{t_\infty} = p_k^{(t)} \equiv p_k^{(H)} = \frac{\exp(-\beta E_k)}{Z}.$$

Set $\beta := \Theta^{-1}$. BG and E0 imply that $$\beta E_k = \frac{1}{n} \sum_{j=1}^{n} \log \frac{p_j}{p_k}.$$

H is unknown at this point, but $\beta H$ is known:

$$\beta H = (\beta E_1, K, \beta E_n, 1)$$

Put $e_\Theta := (0, \ldots, 0, 1)^*$ and $$\beta H = (\beta E_1, K, \beta E_n, 1)$$

One is closer to solving this:

$$\Theta = \|H\| \cos \phi$$

Dimensional analysis (etc.) gives that $$\Theta(t) = \frac{[1]_t}{\|t\|} \Theta\left([1]_t \frac{p}{\|p\|}\right).$$

The sphere lemma gives that $$\Theta(t) = \|H(\|t\| n^{-1/2} 1)\| \cos \phi = \Theta(\|t\| n^{-1/2} 1) \cos \phi$$

From these, it follows that $$\Theta(t) = \frac{K}{\|t\|} \cdot \cos \phi = \frac{K}{\|t\|} \left( \sum_{k=1}^{n} \left( \frac{1}{n} \sum_{j=1}^{n} \log \frac{p_j}{p_k} \right)^2 + 1 \right)^{-1/2}.$$

Consistent w/Intuiton

Zeroth Law: Bijective "TAUT" Map

Figure 2:
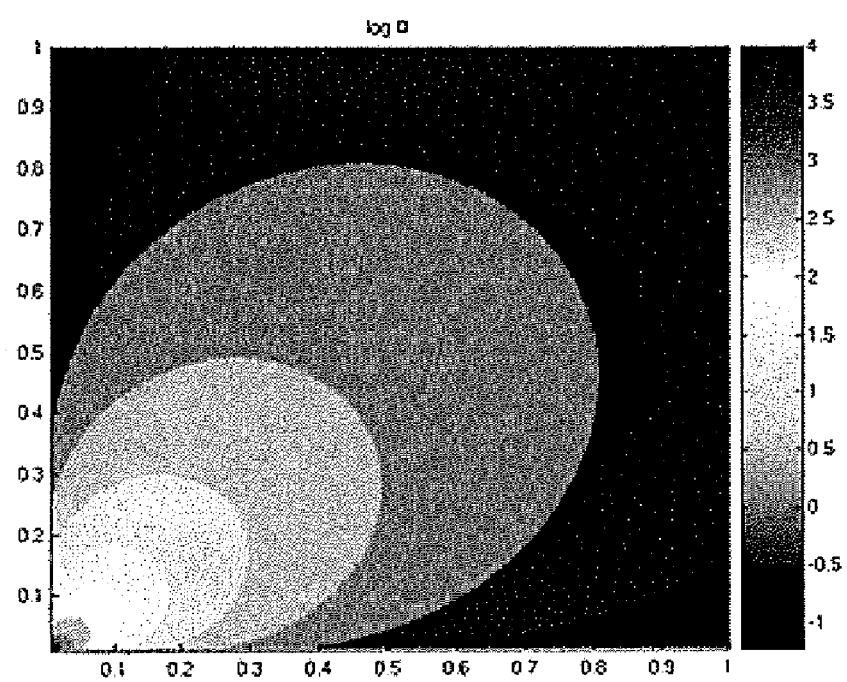
FIG. 2 is a level curve plot of the (logarithm of the) isotherms for a two-state system. This plot is obtained by taking the bijective TAUT (toplogically admissible uniform temperature) map sending t to 1/t and which exhibits the unique scaling consistent with equilibrium statistical physics.

Referring to FIG. 2, absolute zero at infinite COT: implies monotonicity for a TAUT map, with a pole at the origin and asymptote of zero.

There is a universal metaformat for mapping the microdynamics of a complex interacting system (e.g. a GIG node) onto a tractable mesodynamics. Given data—such as mesodynamical leaf node pairs—one may compute a corresponding effective temperature directly. The Gibbs paradox comes into play, however: entropy depends on what is measured, as does temperature Given the temperature, one may close the Boltzmann-Gibbs equations to obtain the energies, and from there other physical quantities of interest. One may therefore monitor the behavior of a complex interacting system using an exact physical correspondence. If the mesodynamics are not well-behaved, the configuration of the sensor can be updated, and intuition gained about the underlying system in the process.

These and more sophisticated but also physically relevant quantities can also be used to discover malicious activity, independent of the number of hosts or bandwidth of exchanges between them. For example, the Doob-Meyer decomposition allows the separation of random and deterministic parts of functions acting on trajectories. By subjecting these signals to mathematical analysis, one establishes provably valid alert criteria for specified detection probabilities and across multiple timescales. This capability, relying on the mathematical formalization of fair games (i.e., martingale theory) is completely unique both in theory and proposed execution.

If the generator Q is constant, the (null) martingale part of a (time-independent) function f (perhaps the simplest example of interest is an indicator function) is given by the Dynkin prescription $$M_t^{(f)} := f(x_t) - f(x_0) - \int_0^t Qf \circ x_s \, ds.$$

The fact that the right hand side (RHS) defines a martingale follows from the equality $$\exp(tQ) - I = \int_0^t Q\exp(sQ) \, ds$$

and applying both sides to f.

For time-inhomogeneous systems (For an introduction, see §5 of Stroock, D. An Introduction to Markov Processes. Springer (2005)) with generator Q(t), the transition matrix satisfies an inhomogeneous forward Kolmogorov equation:

$$D_t P(s,t) = P(s,t)Q(t); P(s,s) \equiv I, t \in (s, \infty),$$

as well as the generalized semigroup equation $$P(r,t) = P(r,s)P(s,t), 0 \le r \le s \le t < \infty.$$

Slightly modifying the idiom of quantum theory, is the introduction of the propagator, given by a standard time-ordered exponential à la $$U(t) \equiv P(0, t) = TO\exp\left(\int_t^0 Q(s) \, ds\right) \equiv TO^* \exp \int_0^t Q(s) \, ds,$$

and which governs the overall time evolution, since by the semigroup equation one has $$P(s,t) = (U(s))^{-1} U(t).$$

It can be shown that the propagator satisfies $$p(s+t) = p(s)U(t),$$

where p denotes a probability distribution, and $$\frac{d}{dt}U(t) = U(t)Q(t).$$

An important point about the propagator is that it embodies the Markov property: i.e., for a (nice) time-independent function f $$E_{x_s}(f \circ x_{s+t} | F_s) = U(t)f \circ x_s.$$

To see this, simply observe that $$E(f \circ x_{s+t} | F_s) = p(s+t)f = p(s)U(t)f.$$

It follows that $$(U(t) - I)f \circ x_0 = \left(\int_0^t U(s)Q(s) \, ds\right) f \circ x_0$$

$$= \int_0^t U(s)Q(s)f \circ x_0 \, ds \Rightarrow Ef(x_t) - f(x_0)$$

$$= E \int_0^t Q(s)f \circ x_s \, ds$$

The appropriate generalization of the Dynkin construction is therefore not a surprise:

$$M_t^{(f)} := f(x_t) - f(x_0) - \int_0^t Q(s)f \circ x_s \, ds.$$

If f is time-dependent, the situation is of course more complicated. But in most cases one should be able to assume that both the function and the generator vary rather slowly in time. In those cases where this is not true, one should look for a breakdown of the formalism to indicate that something interesting is going on. Thus in spirit the situation is quite similar to that for the basic thermodynamical quantities.

Note in particular that although the putative martingale part is constructed once per cycle, it is nevertheless a continuous function of a continuous time variable. The extent to which it departs from a bona fide martingale part will essentially be a function of changes in the generator and/or function f.

Let $M_k$ be a discrete martingale such that the differences are bounded:

$$P(|M_k - M_{k-1}| \le c_k) \stackrel{\forall k > 0}{=} 1.$$

The Azuma-Hoeffding inequality (AHI) states that for x>0

$$P(|M_k - M_0| \ge x) \le 2\exp\left(-\frac{x^2}{2\sum_{j=1}^k c_j^2}\right).$$

A discrete (putative) martingale $M_k$ is obtained by sampling a continuous-time (putative) martingale described at stopping times, so that the AHI can be applied.

The user should be able to specify a threshold probability $p_{AH}$ for automatic alerting based on the AHI. If, for example, cycles average slightly less than a second, then one has roughly $10^5$ cycles per day. Setting $p_{AH}$ to $10^{-5}$ would then produce an average of one alert per day. Now $$P((M_k - M_0)^2 \ge x^2) \equiv p_{AH} \le 2\exp\left(-\frac{x^2}{2\sum_{j=1}^k c_j^2}\right) \Leftrightarrow$$

$$2\sum_{j=1}^k c_j^2 \cdot (\log 2 - \log p_{AH}) \ge x^2.$$

So the alert criterion is $$(M_k - M_0)^2 \ge 2\sum_{j=1}^k c_j^2 \cdot (\log 2 - \log p_{AH}) \Rightarrow \text{alert}.$$

The RHS is easy to compute in O(1) operations by updating the sum.

The following is an outline of one embodiment of the overall approach for martingale-based feature detection at a high level in pseudocode for a time-independent function f:

set a discrete timescale k
    form a buffer of length k
    set an alert/threshold probability $p_A$
    while the state evolution occurs
        for the current cycle
            obtain the current generator Q
            compute the matrix product Qf
            evaluate a discrete martingale by sampling
            insert the result at the front of the buffer
            compute the corresponding bound for martingale differences
        test a martingale inequality over the buffer with the bounds and $p_A$ as inputs
        return alert data from violations of the inequality
        end
    end Even if the AHI works flawlessly, though, the problem of attribution is present. By analogy, consider the application of AHI to an unbiased random walk on z in discrete time. The position $w_k$ of the walker at the kth step is a martingale, and the AHI gives $$P((w_k - w_0)^2 \geq x^2) \leq 2e^{-x^2/2k}.$$

a. Given the issues raised above, it seems that a good strategy is to work on multiple timescales. It is possible to fuse martingale alerts across timescales to get a good automatic indicator of not only the existence of an anomaly but also of its relevant timescale.

b. At the same time, a mechanism for putative martingales to somehow expire and restart is desirable, especially after an alert—where the putative validity of the martingale property has been expressly undermined. The simplest way to effect this and address a) above is to set the expiration timescale by hand, running many putative martingales in parallel, and possibly over multiple expiration timescales.

i. Since the arithmetic is simple, one may start a putative martingale each cycle that expires after some number K of cycles. This is unlikely to require any significant overhead. Testing AHI is also a matter of simple arithmetic and not an issue for concern.

ii. One may and should do this for more than one value of K.

iii. The values of K should correspond to timescales of interest, and a good starting rule for cycle durations of about a second might be $K = 10^a$, for $a = 0, 1, \ldots, 6$ (covering all orders of magnitude from a second up to ten days).

c. Note that the putative (discrete) martingale values take very little room, and may be stored effectively indefinitely: if a cycle lasts slightly less than a second on average, so that there are roughly $3 \cdot 10^6$ cycles per month, then storing a month's worth of 64-bit values requires roughly 24 MB of memory.

Lab Prototype Implementation

Physically, the present commercial prototype system consists of at least one sensor and one core (a/k/a traffic analyzer; the sensor and core may be instantiated on the same computer at low bandwidth). The role of the sensor is essentially to sniff packets and associate both source and destination leaf nodes to each packet according to the user-defined tree logic. The resulting leaf node pairs and timestamps and the corresponding packets themselves (or pointers to them) are made available to the core, which collects this information from the sensor. The core then performs routing, thermal, and fluctuation analyses, calculating and making available the relevant quantities for display, in concert with alerts from other systems if desired. The display is interactive, allowing a user to identify interesting portions of traffic and perform complete drill-down graphically. The ability to distribute sensors and aggregators to suit the topology and traffic of a particular network (e.g., by placing sensors at gateways or critical points) is just one way in which the system's intrinsic versatility can be exploited over a wide variety of network scales.

Technical Implementation of the THETA System Link Estimates

The THETA system operates on individual packets rather than flows or their ilk. With this in mind one may begin with some basic link estimates. A conservative (but not minimal) nominal packet size of ~300 B implies a throughput of ~400 Kpps/Gbps (pps=packets per second). Thus an OC-3 link conservatively corresponds to ~100 Kpps, and an OC-192/10 Gbps link to ~4 Mpps. These and similar estimates will be used below without further comment.

Overview of the THETA System Architecture

The THETA system architecture is modular, consisting of a sensor module, a core module, and a user module. These respectively collect/parse, process, and display information in sequence, and perform some straightforward I/O in the course of forensic analysis or drill-down. The sensor module is composed of sensor and a traffic database components, and the user module is composed of an integration interface and an analytic interface, respectively.

1. Incoming traffic
2. Sensor packets
3. IP and sensor packets
4. All traffic analyzer output (thermal, fluctuation, and postprocessing)
5. Drill-down query and response
6. Likelihood feed (fluctuation processing output)
7. Activity detection message
8. Query for IDS cue and response
9. Capture file to IDS and IDS output
10. Activity detection message (to external network)

The arrows are described in the following table.

| Arrow | Description | Bandwidth at peak usage with mean packet length = 300 B |
|---|---|---|
| 1 | Incoming traffic | 1 Gbps |
| 2 | Sensor packets | 37 Mbps |
| 3 | Packet headers + sensor packets | 170 Mbps |
| 4 | All traffic analyzer output (thermal, fluctuation, etc.) | <1 Mbps |
| 5 | Drill-down query and response | <1 Mbps |
| 6 | Likelihood feed (fluctuation processing output) | <1 Mbps |
| 7 | Activity detection message | <1 Mbps |
| 8 | Query for IDS cue and response | <10 Mbps nominal |
| 9 | Capture file to IDS and IDS output | <10 Mbps nominal |
| 10 | ADM transmission from EII or auxiliary IDS | <1 Mbps |

Note that the 300 B estimate used for peak usage bandwidth is conservative: the maximum transmission unit on gigabit-class networks is typically at least 9 KB, or six times the 1.5 KB on lower-speed networks, and so mean packet lengths can be expected to be significantly larger than the 300-400 B figure that is more characteristic of low-speed networks.

Figure 3:
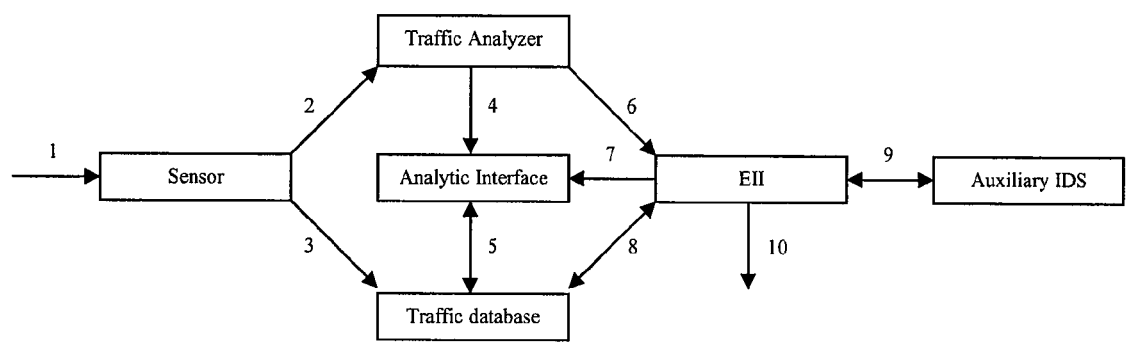
FIG. 3 illustrates the THETA system architecture.

Referring to FIG. 3, in one particular embodiment, the sensor module uses a DAG to collect and timestamp packet headers, whereupon they are passed to a sniffer using the DAG Application Programming Interface (API). The sniffer output is sent both to the tree logic and (together with the results of the tree logic processing) to traffic database. This tree logic takes information about the packet headers and a configuration file (which is generally dynamical and associated to one or more node databases (NDBs) which are periodically written to hard disk to allow graceful shutdowns and restarts) and assigns source and destination leaf nodes for the packet. These two leaf nodes and the timestamp, along with a few ancillary fields, are turned into a sensor packet by a parser. The sensor packets are placed in a queue and sent from there to the core/traffic analyzer module.

The core has an I/O interface that allows for the transmission and reception of sensor packets between the sensor module and the core, where various mathematical/physical algorithms are applied to the sensor packets. The core sends each type of data it produces on a separate socket to the user module.

The sensor is divided into several subcomponents including a DAG, the tree logic, node databases, and a parser/queue. Each of these are addressed in turn.

DAG

Traditionally, networks have been measured in two different ways: 1) using software tools or 2) using custom hardware. The software-only solutions are cheap and versatile, but are not suitable for high speed networks. Hardware solutions are expensive and not versatile. DAGs are passive network measurement systems that use a hybrid approach based upon a PCI card plugged into a standard workstation. This solution provides the benefits of software solutions along with excellent performance by off-loading data acquisition to hardware. A detailed analysis shows that in order to obtain high-quality timestamps (necessary for certain types of martingale constructions) on multi-gigabit links the best overall option is to use a DAG card. Based on extensive technical exchanges with both major DAG suppliers (Endace and Napatech/Npulse), it has been determined that Endace (www.endace.com) uses the more appropriate design principles and software interface for this application.

The DAG can provide BPF-like filters and up to eight separate streams, thereby helping the initial move to parallelization and/or multiple sensor instantiations on a single sensor module. In fact the entire sensor design is highly parallelizable, with the possible exception of NDBs, which will be addressed below.

The Endace API provides a C interface. This offers functionality similar to pcap and its kin, and it will be used to build a sniffer that will extract layer 3 and 4 headers along with timestamps generated by the DAG. The resulting headers are sent both to a hard disk and to the tree logic.

Tree Logic

The tree logic propagates packet header information through decision trees in order to assign source and destination leaf nodes. The nodes of a decision tree may be either static, and correspond to simple logic on header fields and a node configuration file, or dynamical, in which case a NDB takes the role of the node configuration file.

Figure 4:
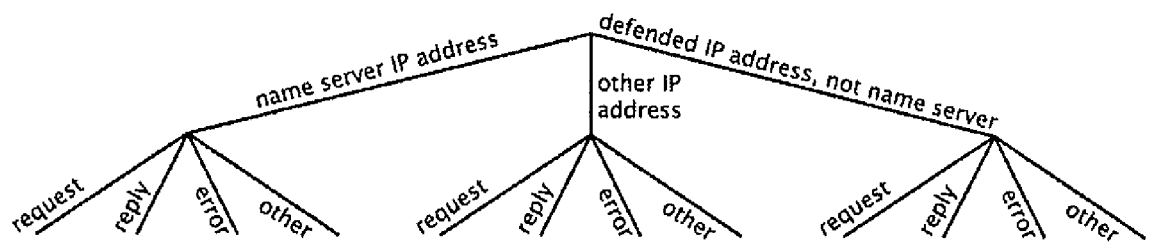
FIG. 4 illustrates exemplary static tree logic that is appropriate for ICMP traffic and name servers.

FIG. 4 illustrates exemplary static tree logic that is appropriate for ICMP traffic and name servers. If for example one replaced "defended IP address, not name server" with "IP seen in the last day" then the logic would be dynamical and a NDB would be necessary.

Because the number of leaf nodes, in one embodiment, is bounded by 32 (for reasons described below), the number of nontrivial nodes at all levels of the tree is bounded by 31. Similarly, the number of nontrivial nodes per leaf node is theoretically bounded by 31, in this embodiment, although this number will almost always be 5 or less in practice. For each static node, a few comparison operations and/or possibly structured lookups will be required: a figure of merit is 10 or 20 instructions. Thus each packet should generally require fewer than 50-100 instructions for processing through a static tree. This is well within the reach of cheap, off the shelf, (COTS) processors even for 10 Gbps links saturated with small packets. However when highly atypical tree structures and/or dynamical nodes are considered, the demands increase: while OC-3 links will not present much difficulty, the tree logic requires acceleration on 10 Gbps links. In particular, the updating of NDBs only appears tenable if the updates are done in batch form on a per-cycle basis.

Node Databases

The requirements for a NDB include the ability to store unique source and/or destination IPs, unique IP pairs, header lengths, flags, time to live, ports, unique sockets, unique ICMP types and codes, flags, etc. One will also be able to (e.g.) determine whether or not an IP has been observed within or after some auxiliary timescale. Speed, flexibility, and modularity are the guiding principles for the construction of the NDB.

All NDBs will share a common format containing header fields, along with a mask specifying the particular fields of interest for any given instantiation. The NDB will have a buffer whose duration is given by an integral number of cycles, specified either directly, or indirectly through a timescale which will be used to define the appropriate number of cycles (see the discussion elsewhere on defining cycle duration, and note also that this requires the core module to send cycle interrupt signals to the sensor module). This provides an efficient storage scheme whereby each packet header will be written to the NDB, which will contain the single most recent headers with unique unmasked field values, along with a buffer of counters of the number of packet headers with those field values during those cycles still in the NDB buffer.

At a peak of 4 Mpps and ~80 B per augmented packet header, the NDBs will have to deal with roughly 320 MBps of data. In particular, the sensor RAM needs to be able sustain I/O at that bandwidth. This is well within the reach of current PC/workstation RAM: e.g., XDR DRAM. The first goal for the system is imposed by the peak data rate of data sources. The system should be able to receive data at this peak rate without an overrun; that is, without losing data. The second goal is that the system must be able to process and write the data to the NDB at the average data rate. Writing can proceed at the average rate as long as there is enough memory to buffer short bursts at the peak rate.

Since in general there will be a high degree of redundancy in packet header fields of interest, a reasonably conservative estimate is to allocate significantly less than 1 GB of RAM for each NDB on an OC-3 link, and ~4 GB of memory for each NDB on an OC-192/10 Gbps link.

Parser/Queue

Figure 5:
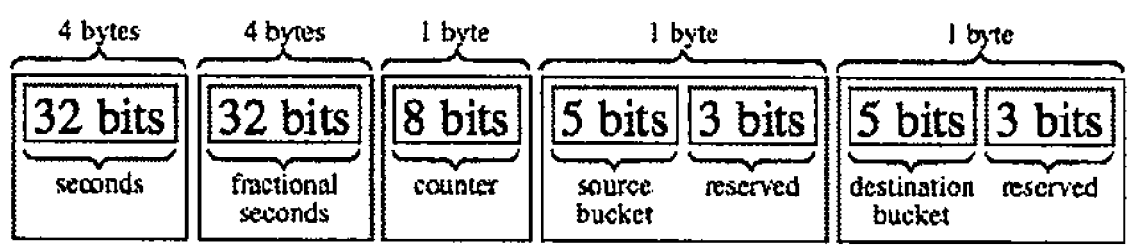
FIG. 5 illustrates a sensor packet format.

Finally, the tree logic output is parsed into sensor packets formatted as illustrated in FIG. 5.

From there the sensor packets, as illustrated in FIG. 5, are placed in a queue and sent in sequence to the core module. The sensor packets provide a temporal range of 136 years and resolution of 0.232 nanoseconds. (A minimum-length IPv4 packet would be transmitted over a 10 Gbps link in 57.6 ns and a 1 Tbps link in 0.576 ns. By comparison, Endace DAG cards currently offer 7.5 ns resolution.) The counter is a "failsafe" field that will also serve to increase the temporal resolution to 0.909 picoseconds as the enabling technology (e.g., rotary wave traveling oscillator clocking) becomes available. The sensor packet format is capable of working on 100 Tbps links at saturation.

Overall Design Considerations

Placing the tree logic and NDBs on hardware separate from the core is preferred for high-speed links and allows greater simplicity and flexibility for both modules. It represents the biggest conceptual change in the sensory apparatus of the THETA system from earlier approaches. The sensor packets are less than half the size of their analogues in a previous approach, while providing nanosecond versus microsecond resolution. In general, the sensor/core link requires roughly 0.5% of the bandwidth of the monitored link, though some overhead should be built in for the event of saturation with small packets.

Finally, it will be desirable to combine the output of several sensor modules. The appropriate way to do this is to form super leaf nodes mapping several source/destination leaf node pairs to a single source/destination super leaf node pair. This will require an auxiliary module sitting between multiple sensor modules and a single correspondingly more powerful core module.

Overview of the Core Module

The only input to the core is a sensor packet containing a 64-bit timestamp, an 8-bit counter, and two 8-bit leaf node fields each containing a 5-bit number and reserving 3 bits for sensor identification. If the first bit of the timestamp is set, a special packet (currently only a cycle delimiter is specified) is indicated. There are relatively few per-packet operations done in the core, primarily:

forming packet-induced trajectories (e.g., leaf node pairs or quotient space elements);
and updating the state occupation time and routing counters Neither of these takes more than a handful of operations. So even at the theoretical maximum of approximately 18 Mpps one might encounter on a 10 Gbps link, a single processor core appears to be more than equal to the task of the planned per-packet processing. Because the trajectory can be partially parallelized, a mid-range server (e.g., a HP DL785) should be capable of handling 100 Gbps links.

Most of the thermal processing operations require a negligible amount of processing power by comparison (although the operations are far more complex, their scale is bounded), and no interface will need to perform many significantly processor-intensive tasks (though it may perform some post-processing in the analytic interface, it will be conducted in a way guaranteed to keep up or fail safely even at faster-than-real-time speeds).

In order to support normal operation consistent with the physical and mathematical underpinnings, (especially the renormalization group idiom of statistical physics and its associated fusion strategy for the THETA system) the number of supported leaf nodes will be no greater than 32. It may be desirable eventually to support up to a full byte's worth of leaf nodes (in Java this would amount to 127 because there are no unsigned types).

Other than the sensor and traffic database, the only system subcomponent processing requirements that do not scale sublinearly with the number of packets are the sensor packet capture, the leaf node pair analysis, and the fluctuation processing. Additionally, the scale of each individual query response between the traffic database and the EII may grow up to linearly with the traffic rate.

Because the sensor packets are considerably smaller than even TCP/IP headers (a sensor packet is 11 bytes, versus 40 bytes for a TCP/IP header), the sensor packet capture will tautologically be feasible at arbitrary link speeds. Note that this assumes that sensor packets are sent in batches, so that the encapsulation of sensor packets does not play a significant role.

The portion of the leaf node pair analysis that scales linearly with the number of packets is simply incrementing counters and so can be parallelized with relative ease. However, this should be unnecessary in any event, since even at 100 Gbps there is a maximum of roughly 180 Mpps, and a single processor core can easily perform this many increments (and their associated simple lookups).

The portions of the fluctuation processing that scale linearly with the number of packets are the formation of an induced trajectory corresponding to the sequence of received sensor packets and (for any martingales that might be constructed using the Dynkin formula) the integration of a function along that trajectory. The latter is embarrassingly parallelizable once the trajectory is known, but by updating the state occupation times on a per-cycle basis, it can be done with even less effort.

The formation of the trajectory itself will be at least partially parallelizable in the particular cases to be employed in the THETA system. In fact, the formation of trajectories for a class of martingales based on leaf node pair doublets (and outlined in the companion design document) is embarrassingly parallelizable: the trajectory is essentially the sequence of observed leaf node pairs, and the transition times are just the (possibly pseudo-) timestamps. For martingales constructed using the Dynkin formula, the trajectory formation can be partially parallelized by virtue of the small number of states that the trajectory will be capable of visiting. While this implies a trivial parallelization opportunity (at the cost of memory space) if the number of available processor cores is greater than the number of states, this situation will not occur in the near future. However, one processor core can compute an initial segment of a trajectory, and several other cores can begin computing all the possible trajectories in the next segment at the same time. The multiplicity of possible trajectories is due to the fact that the end state of the initial segment is not known immediately, but the multiplicity is also small (for the simplest quotient space construction it is equal to the number of leaf nodes). Once this end state is known, however, the "winning" trajectory from the next segment can be continued at the exclusion of the other candidates, and the freed processor cores can repeat this process. Therefore, even though there is no reason to expect the formation of the trajectory to require parallelization even at 100 Gbps due to the extremely simple nature of the operations involved, a partial parallelization strategy exists.

An I/O interface will accept sensor packets and cycle signals from the sensor. A separate I/O interface will send data onwards. Experience (informed by the theory of the renormalization group) has shown that 24 or even 16 is a large number of leaf nodes, and a limit of 32 is reasonable. If more than 32 leaf nodes are required, then super leaf nodes may be introduced.

Routing Quantities

Two fundamental quantities describing the flow of network traffic are leaf node rates and routing matrices. Besides providing a good, intuitive representation of the traffic for the user, they are also necessary inputs for computing other quantities. The rate of the jth leaf node, $q_j$, is a measurement of how often packets are sent from the jth leaf node to any leaf node. The routing matrix R represents the probability of an attempted transition from one leaf node to another.

If the jth leaf node attempts to send a total of $N_j$ packets either to itself or to any other leaf node during a cycle with duration $t_{cyc}$, the (simplest estimate of the) jth leaf node rate $q_j$ is $$q_j = N_j/t_{cyc}.$$

Similarly, if the jth leaf node attempts to send a total of $N_{jk}$ balls to the kth leaf node, the routing matrix entries $R_{jk}$ are given by $$R_{jk} = N_{jk}/N_j.$$

Both q and R may be considered as depending on time t. In order to ensure that q and R behave well it is necessary to condition their entries.

The unique invariant distribution $\pi$ is the left eigenvector of R satisfying $$\pi R = \pi, \pi_1 + \ldots + \pi_B = 1$$

and is computed in using a linear solver (it can be shown that an eigensolver is unnecessary so long as R is conditioned to be ergodic), yielding a probability associated to each leaf node that complements the leaf node rates. The B-tuples q and $\pi$ are used to compute occupation times for the leaf nodes themselves. These are in turn inputs for the computation of thermodynamic quantities that respectively capture observed variations of traffic across different points in leaf node space and idealized approximations with simple characteristics.

Core Thermodynamical Quantities

A preferred quantity to compute in order to begin doing statistical physics and thermodynamics is the temperature $\Theta$. Given the a characteristic recurrence time (such as a cycle duration) $t_\infty$ and an n-tuple of occupation probabilities $p_k$, the unique temperature function consistent with equilibrium statistical physics is computed as $$\Theta(t) = \frac{1}{t_\infty \|p\|} \left( \sum_{k=1}^n (\log p_k + \log Z)^2 + 1 \right)^{-1/2};$$

$$\log Z = -\frac{1}{n} \sum_{j=1}^n \log p_j.$$

In the course of computing $\Theta$, the partition function Z and free energy $F = -\Theta \log Z$ are trivial to obtain. Closing the Gibbs relation yields the state energies via $E_k = -\Theta \log(Zp_k)$. Both $\Theta$ and the (Shannon) entropy S take O(n) operations to compute, and from here the internal energy U is computed trivially via $U = F + \Theta S$.

To get a basic sense of the influence of the traffic on the behavior of thermodynamical quantities here, consider an example with three leaf nodes. The tree logic is as follows: the parent node determines whether or not an IP address is in the defended network; and (only) if it is not, a child node determines whether or not that IP has been observed recently. Suppose that no new IPs outside the defended network have been observed for some time, so that only two of the leaf nodes are communicating and only a line of points in the triangular leaf node space is explored. If during the next cycle, the third leaf node begins communicating as well, then not only will the entropy increase, but the temperature will as well.

Fluctuations, Martingale Methods and Advanced Alert Techniques

One of the more advanced general techniques that may be implemented uses the leaf node rates and routing matrices to construct a generator matrix Q that embodies the time evolution of functions on leaf node space (a similar construction applies to functions of the leaf nodes themselves). With Q in hand, one may extract the random fluctuations of a function f (treated as a column vector upon which Q operates), e.g. the state coordinates, energy, entropy density, the state probabilities themselves, etc. via the so-called Dynkin formula $$M_t^{(f)} := f(\alpha_t) - f(\alpha_0) - \int_0^t (Qf)(\alpha_s) ds$$

or its technical generalizations. The fluctuating quantity defined on the left hand side (LHS) above has the remarkable property of so-called martingales that its expected value at any future time precisely equals its current value—it is the random part of the function. The well-established mathematical theory of martingales provides theorems that one may apply to the fluctuations to provide rigorous automated anomaly detection without the use of or need for heuristics. In particular, one may have the capability to dictate the alert probabilities (equivalently, the alert rates).

The computational demands in constructing the martingales are mitigated by keeping the dimension of the generator low and the function simple. This is done in practice by executing dynamics on a quotient space of a root lattice and considering only indicator functions on the small quotient space (by linearity, this is equivalent to considering a generic time-independent function).

Auxiliary Modules

One approach is communication from the core to the user module that provides a way to introduce additional functionality by adding a fourth module (or fifth in the case of superleaf nodes) situated between the core and user modules. This will enable later development without affecting (much less compromising) the core. For example, an auxiliary module might focus on pattern recognition/alert generation using, e.g., neural networks or time series analysis.

Overall Design Considerations

Overview of the User Module

In the preferred embodiment of the present invention, the likelihoods and likelihood ratios obtained by the techniques above (and any associated available symbolic data) are forwarded to and stored in a database. In one embodiment, two likelihood parameters are set: data with likelihoods below the lesser of these parameters is tagged with a feature detection indicator, and data with likelihoods between these parameters is tagged with a possible feature detection indicator. In another embodiment, these indicators are read from the database by a separate monitoring process and a complementary analytic or interactive method is invoked.

In a particular embodiment of the present invention, the routing data produced is made available for interactive visualization. Because the rows of the routing matrix R and the elements of the routing distribution q sum to unity, their time evolution may be easily displayed in either two or three dimensions. In two dimensions, a colored stacked bar chart suffices, whereas in three dimensions information can be conveyed via intensity and/or transparency, with a nonlinear correspondence between these values and the underlying data serving to highlight deviations from zero or from unity. The display is interrogated and an interactive histogram corresponding to the particulars of the interrogation is displayed; a drill-down process continues until a sufficiently small amount of data to warrant a textual display remains and is displayed and stored in a separate database to enable forensic post-analysis. In another embodiment, thermodynamical data is made available for visualization and interrogation.

A user module may be comprised of data I/O, graphics processing, and forensic query subcomponents. There are separate I/O interfaces for communication with the core, the traffic database, and between analytic and data interfaces, respectively. Incoming core data produced by the core is sent to RAM once per cycle and post-processed for visual display and analysis. Any such post-processing is performed in a modular, object-oriented fashion using Java, and the results will be sent to a graphics engine and from there to a GUI. The GUI supports forensic queries, which are sent to the traffic database. The user module also features a forensic database that will store the results of queries.

GUI and Queries

More often than not, a user will not have the capability or inclination to watch an interactive display for any significant length of time. With that in mind, an autonomous detection capability for alerts based on the response of a conventional IDS cued by the automatic review of traffic analyzer output is necessary.

At the same time, not only the configuration of the system but also its sustained use in many settings (e.g., CERTs or theater NOSCs, which are intensively staffed) suggests the utility and desirability of an interactive visualization capability. The appropriate analogy is one with security cameras: one may have building alarms, motion detectors, and the like, but when a physical intrusion occurs, it is always desirable to replay the video feed.

With this in mind, a user will be able to graphically interrogate displays in a layered process. If for instance the user was alerted to and subsequently chose to interrogate data from a given cycle, the number of corresponding packets might be in the millions on high-speed links. Clearly it is necessary to display the results of such a query with a medium other than text. A threshold on the number of transitions or packets to be displayed with text is set in the system beforehand, and if the size of a query response exceeds that threshold, then e.g., a clickable histogram or intermediate dialog activates, allowing the user to down-select data or text fields for display and subsequent graphical interrogation.

The goal of the GUI is to present the thermal data and alerts in an intuitive fashion and allow efficient interrogation to drill down to the individual offending packets. In practice, the user interface will typically be used sporadically and in faster-than-real-time replay mode (e.g., 128×).

As an illustrative idea, martingale-based alerts are highlighted in the GUI. Once the user selects an alert, an interactive graphical display showing the corresponding fluctuation data is generated. After zooming in or out, the user might use the display to select time intervals. A dialog box allows the user to pre-filter the corresponding packets by leaf nodes or leaf node pairs. If the number of resulting packets is small, the metadata is returned in the display and can be sorted, post-filtered and/or subsequently interrogated to obtain the packet headers themselves. If the number of packets is large, a clickable histogram (e.g.) might be returned and updated until the displayed data corresponds to a sufficiently small number of packets.

Alert/Event Log

A log may be generated containing alerts based on the analysis of martingales, externally integrated devices, and/or events based on user-configurable macros. The fields presented to the user in the alert/event log can be interactive, so that e.g., a user can click on an object carrying leaf node information and retrieve the data involving that leaf node, then click on the timestamp and retrieve the corresponding IP packet header from the sensor.

Summary

The end result provided by the user interface is a tool enabling alert logging and monitoring, as well as rapid, graphical interrogation/drill-down supporting the identification and analysis of individual packets. The real-time functionality, while an attractive default, will be supplanted by a replay functionality allowing intermittent monitoring of full traffic. At a lower (and more typical) level of detail and user effort, the alert/event log provides a simple, clear interface for the THETA system.

Software and Hardware

The GUI is being be developed in OpenGL with a wrapper, viz. JOGL. Other related software may be used as needed, with a development emphasis on portability and usability. The non-graphics processing demands are (limited mainly to the I/O and forensics database and) are modest, not requiring specialized hardware.

If an embodiment will be using transparency effects and extensive dynamical user interaction in 3D, this might indicate a desire for a high-end GPU, e.g., NVIDIA Quadro FX 3700-5600 cards at present (a current prototype display makes use of a FX 3700 GPU). These GPUs are capable of displaying up to 300M polygons per second and 19 G texture elements per second, with up to 76 GBps bandwidth. By comparison, the number of polygons for the routing display is on the order of 1-10 M: even with 60 frames per second this is not difficult to implement. Likewise, a notional 3200×1600 display at 60 frames per second with 24-bit color and an alpha (transparency) channel requires 10 GBps bandwidth, or an order of magnitude below what is available. Even accounting for multiple windows and displays, a single high-end GPU will suffice.

Code(r) Estimates

The sensor module may run on Linux and may be coded in C/C++, using the Endace API. The particular embodiment of the core module currently being developed is coded in Java, and the particular embodiment of the user module currently under development is coded in Java and JOGL.

THETA System Hardware Estimates

The sensor module may feature the use of DAG cards and/or integrated DAG appliances. No specialized hardware appears to be necessary for the core (or any auxiliary) module. The only specialized hardware that appears to be required for the user module may be a large, high-resolution display and a high-end GPU. In the event that further hardware acceleration is desired for the sensor module at low cost and without using extra CPU cores, a GPU can be used (e.g., NVIDIA cards leveraging CUDA).

As a recent example illustrating the use of the analytic interface in one embodiment of the invention, a visualization of simple HTTP test data with and without a port scan added is described below. The visualization example uses the routing display (one of several anticipated visualization tools), which shows leaf node transmission rates, likelihoods of source and destination leaf node pairs, and induced likelihoods of individual leaf nodes over time in a unified display.

The routing matrix uses transparency (or the lack thereof) to convey data, and color for referencing source leaf nodes. Time series for the routing matrix, normalized and aggregate leaf node rates, and leaf node distribution are combined in a unified visual format.

Referring to FIG. 6, FIG. 6 illustrates exemplary background HTTP traffic in a 3D routing display. Rows of the main portion (outlined in blue) indicate source leaf nodes and columns indicate destination nodes. The rectangular boxes indicate the leaf node rates, leaf node pair likelihoods, induced leaf node likelihoods, and a nonlinear scaling of the overall traffic rate (in white; this may be supplemented by a line graph).

The traffic initially analyzed was simulated benign web browsing. Tree logic for TCP and UDP packets is depicted in the FIG. 1. This tree logic is extremely generic but still makes use of a node database.

Given the nature of the traffic, one would expect to see the following leaf node pairs:
  (4,6) Initial HTTP request from inside to outside;
  (6,3) Initial HTTP response from outside to inside; and
  (3,5) & (5,3) Inside to outside and outside to inside flow, respectively This is in fact what was seen. With the addition of a port scan, one would expect to also see
  (4,2) Initial internal ephemeral-to-known port traffic;
  (4,4) Initial internal ephemeral-to-ephemeral port traffic;
  (2,3) & (4,3) Respective initial responses; and
  (1,3)/(3,1) & (3,3) Respective ongoing traffic.

This is illustrated in FIG. 6, which illustrates an exemplary routing display of RTEN HTTP traffic without (FIG. 6*b*) and with (FIG. 6*c*) a port scan added.

This was again what was seen, but near the end of the test the leaf node pair (2,4) was found. Forensic analysis via Wireshark showed that this was due to activity by the Netgear switch that was being used: it communicated from many source ports to port 46435, and via HTTP to many ephemeral destination ports. A handful of other packets also contributed: these were SSH and IPP traffic from the workstation that the packet capture was being performed on. However, no replies to any of this traffic were present: these would have corresponded to the pair (4,1).

Figure 6A:
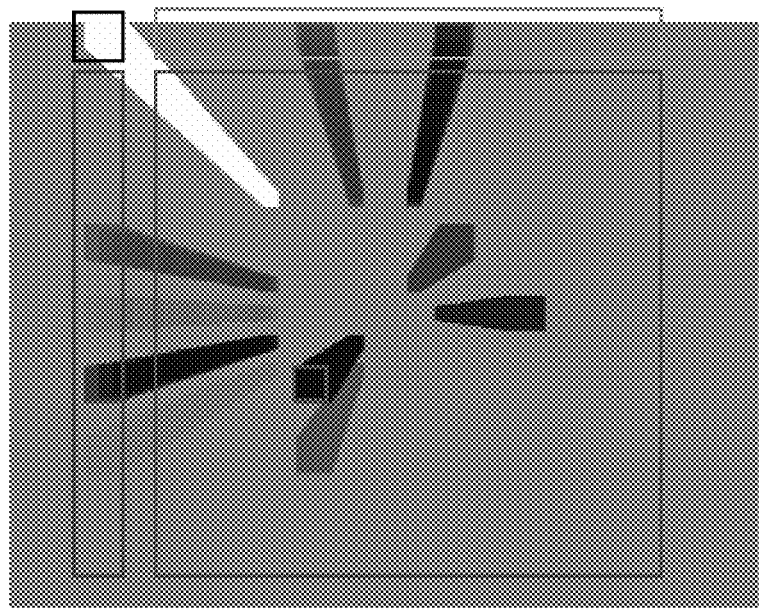
FIG. 6 illustrates exemplary background HTTP traffic in a 3D routing display and the same background traffic with anomalous traffic inserted.
Figure 6B:
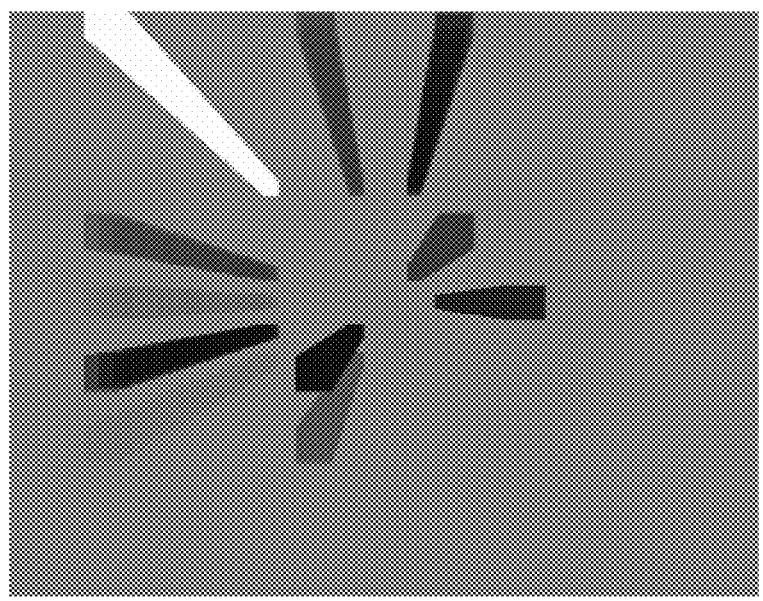
Figure 6C:
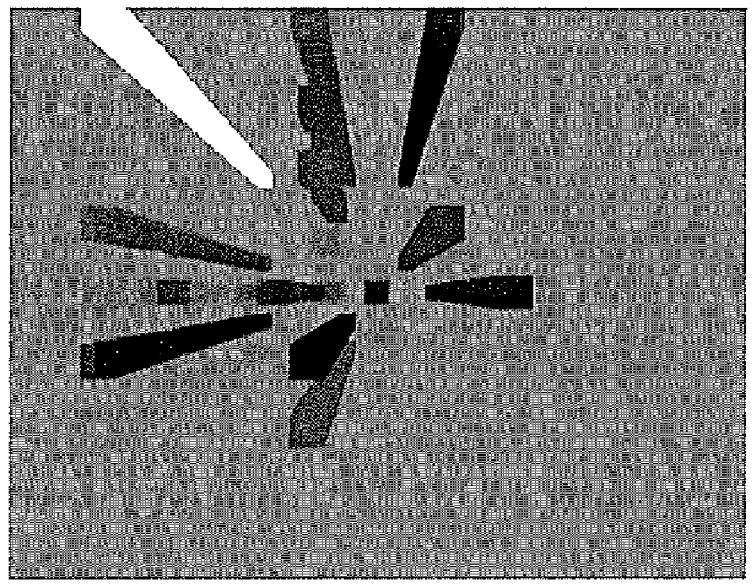
Figure 6D:
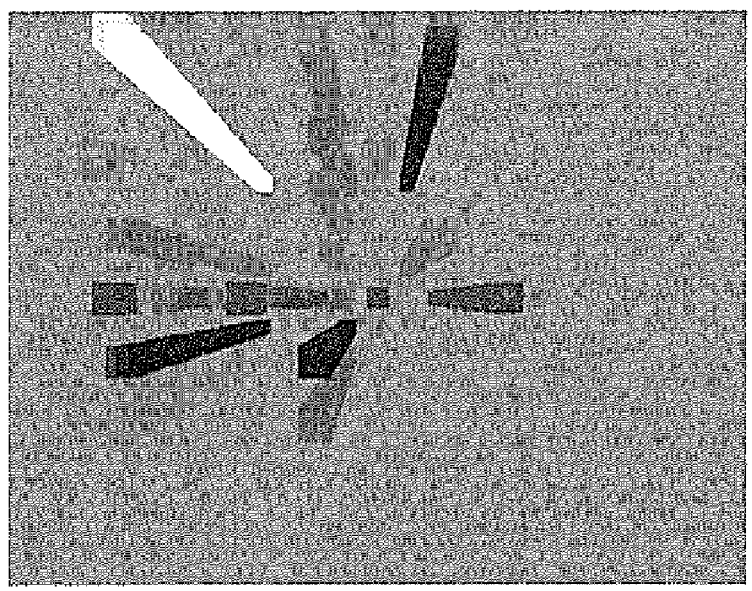

FIG. 6*d* illustrates an exemplary routing display showing the traffic due to the Netgear switch and capture workstation. Preliminary tests indicate the applicability of thermal data as an indicator of malicious activity (see figure).

Figure 7:
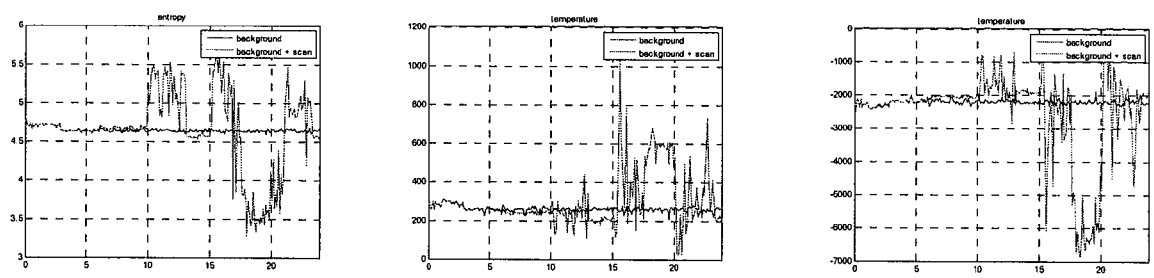
FIG. 7 illustrates entropy, temperature, and free energy from an express prototype on automatically generated HTTP traffic with and without a port scan.

FIG. 7 illustrates entropy, temperature, and free energy from express prototype on RTEN HTTP traffic with and without a port scan.

One or more aspects of the present invention may include a computer-based product, which may be hosted on a storage medium and include executable instructions for performing one or more steps of the invention. Such storage mediums can include, but are not limited to, computer disks including floppy or optical disks or diskettes, CDROMs, magneto-optical disk, ROMs, RAMs, EPROMs, EEPROMs, flash memory, magnetic or optical cards, or any type of media suitable for storing electronic instructions, either locally or remotely.

The term "plurality of network events" may refer to a subset of network events, as long as there are at least two, i.e., a plurality. Accordingly, if a system receives 100 network events, and performs a first action upon events 1-30, and a second action upon events 20-50, then events 20-30 are a plurality of network events, as any other combination of events would be.

The invention being thus described, it will be apparent to those skilled in the art that the same may be varied in many ways without departing from the spirit and scope of the invention. Any and all such modifications are intended to be included within the scope of this disclosure.

The following is claimed:

1. A computer-implemented method for information assurance, comprising:
  receiving an anomalous event parameter;
  receiving a plurality of network events from a network;
  associating each of the network events with a timestamp;
  classifying each of the network events into at least one of a plurality of cycles, based, at least in part, on the timestamp;
  forming an ergodic routing matrix and its associated set of rates corresponding to the plurality of network events;
  forming a dynamical state probability distribution corresponding to the plurality of network events;
  computing a discrete martingale for the plurality of network events;
  computationally determining whether or not a network event of the plurality is anomalous, based, at least in part, on the anomalous event parameter; and
  at least one of storing the determination to a computer readable medium or displaying the determination.

2. A computer-implemented method, as in claim 1, wherein the method is repeatedly performed in substantially real-time.

3. A computer-implemented method, as in claim 1, wherein the network operates at least ten gigabits per second.

4. A computer-implemented method, as in claim 1, wherein the timestamp has at least 64 bits.

5. A computer-implemented method, as in claim 1, wherein the anomalous event parameter is expressed as a percentage.

6. A computer-implemented method, as in claim 1, further comprising applying tree logic to produce a pair of leaf nodes corresponding to origin and destination data of each of the network events.

7. A computer-implemented method, as in claim 1, wherein computationally determining is based, at least in part, on an Azuma-Hoeffding inequality.

8. A computer-implemented method, as in claim 1, further comprising drilling down in a display.

9. A computer-implemented method, as in claim 1, wherein the discrete martingale is computed for data that is first processed with the aid of a node database.

10. A computerized system for information assurance, comprising:
  a processor;
  a computer readable medium coupled to the processor;
  computer readable instructions encoded on the computer readable medium to:
    receive an anomalous event parameter;
    receive a plurality of network events from a network;
    associate each of the network events with a timestamp;
    classify each of the network events into at least one of a plurality of cycles, based, at least in part, on the timestamp;
    form an ergodic routing matrix and its associated set of rates corresponding to the plurality of network events;
    form a dynamical state probability distribution corresponding to the plurality of network events;
    compute a discrete martingale for the plurality of network events;
    computationally determine whether or not a network event of the plurality is anomalous, based, at least in part, on the anomalous event parameter; and
    at least one of store the determination to the computer readable medium or display the determination on a monitor.

11. A computerized system, as in claim 10, wherein the computer readable instructions are configured to be repeatedly performed in substantially real-time.

12. A computerized system, as in claim 10, wherein the network is configured to operate at at least ten gigabits per second.

13. A computerized system, as in claim 10, wherein the timestamp has at least 64 bits.

14. A computerized system, as in claim 10, wherein the anomalous event parameter is expressed as a percentage.

15. A computerized system, as in claim 10, wherein the computer readable instructions further comprise instructions to apply tree logic to produce a pair of leaf nodes corresponding to origin and destination data of each of the network events.

16. A computerized system, as in claim 10, wherein the computer readable instructions to computationally determine are based, at least in part, on an Azuma-Hoeffding inequality.

17. A computerized system, as in claim 10, wherein the computer readable instructions further comprise instructions to drill down in a display.

18. A computerized system, as in claim 10, wherein the discrete martingale is computed for data that is first processed with the aid of a node database.

* * * * *